(12) United States Patent
Peng et al.

(10) Patent No.: US 11,525,983 B2
(45) Date of Patent: Dec. 13, 2022

(54) CAMERA OPTICAL LENS INCLUDING FIVE LENSES OF +--+- REFRACTIVE POWERS

(71) Applicant: AAC Optics Solutions Pte. Ltd., Singapore (SG)

(72) Inventors: Haichao Peng, Shenzhen (CN); Shiyu Ge, Shenzhen (CN); Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 327 days.

(21) Appl. No.: 16/993,288

(22) Filed: Aug. 14, 2020

(65) Prior Publication Data

US 2021/0055524 A1 Feb. 25, 2021

(30) Foreign Application Priority Data

Aug. 19, 2019 (CN) .......................... 201910764713.8

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

2020/0241247 A1* 7/2020 Zhang ................ G02B 27/0025

\* cited by examiner

*Primary Examiner* — Wen Huang
(74) *Attorney, Agent, or Firm* — W&G Law Group (57) ABSTRACT

The present disclosure a camera optical lens is provided including, from an object side to an image side: a first lens having a positive refractive power; a second lens having a negative refractive power; a third lens having a negative refractive power; a fourth lens having a positive refractive power; and a fifth lens having a negative refractive power. The camera optical lens satisfies following conditions: $0.40 \leq f1/f \leq 0.48$; $-0.75 \leq f2/f \leq -0.50$; $1.20 \leq f4/f \leq 3.20$; $-1.40 \leq f5/f \leq -1.10$; $6.00 \leq d1/d2 \leq 8.00$; $0.80 \leq (R5+R6)/(R5-R6) \leq 6.50$; and $3.00 \leq (R7+R8)/(R7-R8) \leq 10.00$. The camera optical lens can achieve good optical performance while meeting the design requirements for long focal length and ultra-thinness.

10 Claims, 9 Drawing Sheets

CAMERA OPTICAL LENS INCLUDING FIVE LENSES OF +−−+− REFRACTIVE POWERS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece or four-piece lens structure. However, with the development of technology and the increase of the diverse demands of users, and as the pixel area of photosensitive devices is becoming smaller and smaller and the requirement of the system on the imaging quality is improving constantly, the five-piece lens structure gradually appears in lens designs. Although the typical five-piece lens already has good optical performance, its optical power, lens spacing and lens shape remain unreasonable to some extents, resulting in that the lens structure, which, even though, has excellent optical performance, is not able to meet the design requirement for large aperture, long focal length and ultra-thinness.

SUMMARY

To address the above issues, at least one object of the present disclosure is to provide a camera optical lens that meet a design requirement of long focal length and ultra-thinness while having excellent optical performance.

For solving the aforementioned problem, a camera optical lens is provided including, from an object side to an image side: a first lens having a positive refractive power; a second lens having a negative refractive power; a third lens having a negative refractive power; a fourth lens having a positive refractive power; and a fifth lens having a negative refractive power. The camera optical lens satisfies following conditions: $0.40 \leq f1/f \leq 0.48$; $-0.75 \leq f2/f \leq -0.50$; $1.20 \leq f4/f \leq 3.20$; $-1.40 \leq f5/f \leq -1.10$; $6.00 \leq d1/d2 \leq 8.00$; $0.80 \leq (R5+R6)/(R5-R6) \leq 6.50$; and $3.00 \leq (R7+R8)/(R7-R8) \leq 10.00$; where f denotes a focal length of the camera optical lens; f1 denotes a focal length of the first lens; f2 denotes a focal length of the second lens; f4 denotes a focal length of the fourth lens; f5 denotes a focal length of the fifth lens; d1 denotes an on-axis thickness of the first lens; d2 denotes an on-axis distance from the image-side surface of the first lens to the object-side surface of the second lens; R5 denotes a curvature radius of the object-side surface of the third lens; R6 denotes a curvature radius of the image-side surface of the third lens; R7 denotes a curvature radius of the object-side surface of the fourth lens; and R8 denotes a curvature radius of the image-side surface of the fourth lens.

In one embodiment, the camera optical lens further satisfies a condition of $-10.00 \leq f3/f \leq -0.80$; where f3 denotes a focal length of the third lens.

In one embodiment, the camera optical lens further satisfies following conditions: $-1.71 \leq (R1+R2)/(R1-R2) \leq -0.39$; and $0.08 \leq d1/TTL \leq 0.31$; where R1 denotes a curvature radius of the object-side surface of the first lens; R2 denotes a curvature radius of the image-side surface of the first lens; and TTL denotes a total optical length from the object-side surface of the first lens to an image surface of the camera optical lens along an optical axis.

In one embodiment, the camera optical lens further satisfies following conditions: $0.41 \leq (R3+R4)/(R3-R4) \leq 4.41$; and $0.02 \leq d3/TTL \leq 0.07$; where R3 denotes a curvature radius of the object-side surface of the second lens; R4 denotes a curvature radius of the image-side surface of the second lens; d3 denotes an on-axis thickness of the second lens; and TTL denotes a total optical length from the object-side surface of the first lens to an image surface of the camera optical lens along an optical axis.

In one embodiment, the camera optical lens further satisfies following conditions: $0.02 \leq d5/TTL \leq 0.08$; where d5 denotes an on-axis thickness of the third lens; and TTL denotes a total optical length from the object-side surface of the first lens to an image surface of the camera optical lens along an optical axis.

In one embodiment, the camera optical lens further satisfies following conditions: $0.05 \leq d7/TTL \leq 0.16$; where d7 denotes an on-axis thickness of the fourth lens; and TTL denotes a total optical length from the object-side surface of the first lens to an image surface of the camera optical lens along an optical axis.

In one embodiment, the camera optical lens further satisfies following conditions: $-6.99 \leq (R9+R10)/(R9-R10) \leq -0.55$; and $0.03 \leq d9/TTL \leq 0.09$; where R9 denotes a curvature radius of the object-side surface of the fifth lens; R10 denotes a curvature radius of the image-side surface of the fifth lens; d9 denotes an on-axis thickness of the fifth lens; and TTL denotes a total optical length from the object-side surface of the first lens to an image surface of the camera optical lens along an optical axis.

In one embodiment, the camera optical lens further satisfies a condition of $0.34 \leq f12/f \leq 1.23$; where f12 donates a combined focal length of the first lens and the second lens.

In one embodiment, the camera optical lens further satisfies a condition of $f/TTL \geq 1.09$; where TTL denotes a total optical length from the object-side surface of the first lens to an image surface of the camera optical lens along an optical axis.

In one embodiment, the camera optical lens further satisfies a condition of $Fno \leq 2.55$; where Fno denotes an F number of the camera optical lens.

The present disclosure is advantageous in: the camera optical lens in the present disclosure has good optical performance and has characteristics of long focal length and ultra-thinness, and is especially applicable to mobile phone camera lens assemblies and WEB camera lenses composed by such camera elements as CCD and CMOS for high pixels.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
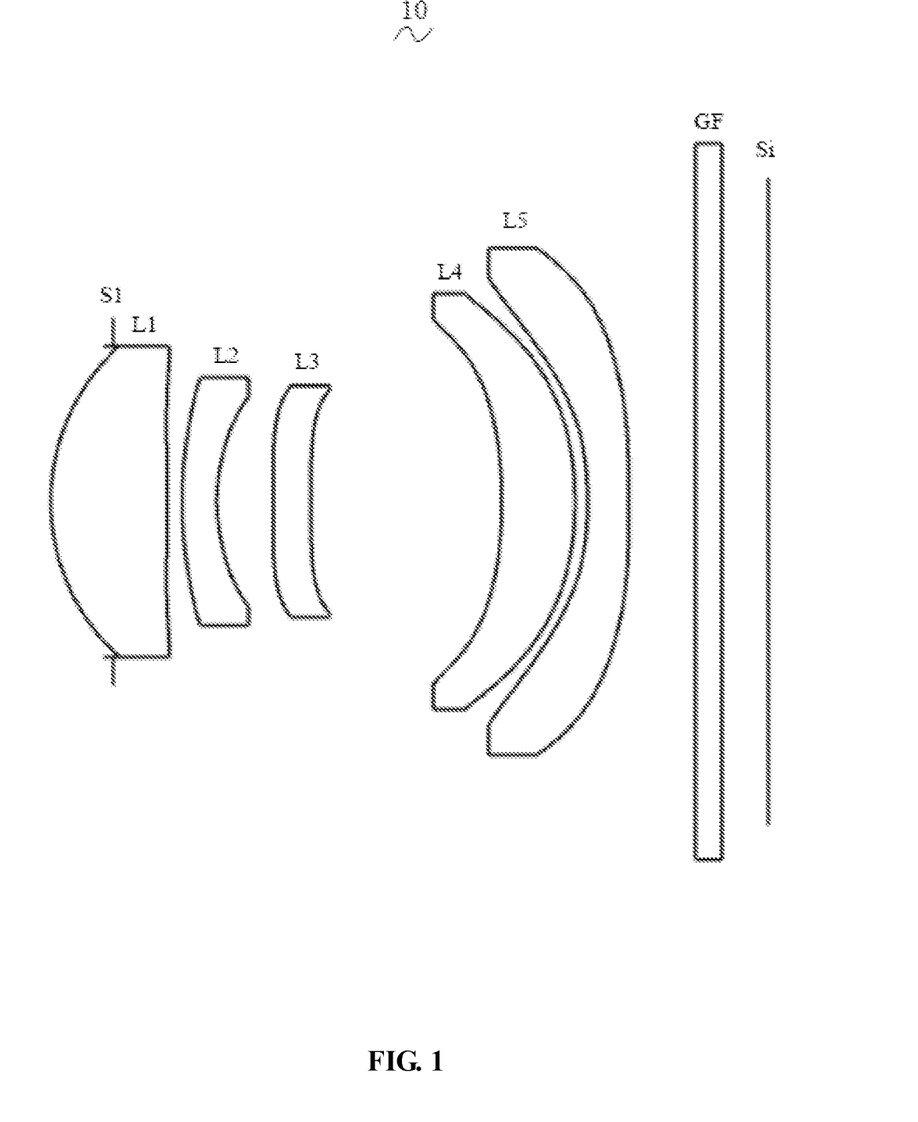
FIG. 1 is a schematic diagram of a structure of a camera optical lens according to Embodiment 1 of the present disclosure.

Referring to the accompanying drawing, the present disclosure provides a camera optical lens 10. FIG. 1 shows a camera optical lens 10 of Embodiment 1 of the present disclosure, and the camera optical lens 10 includes five lenses. Specifically, the camera optical lens 10 includes, from the object side to the image side: an aperture S1, a first lens L1 having a positive refractive power, a second lens L2 having a negative refractive power, a third lens L3 having a negative refractive power, a fourth lens L4 having a positive refractive power and a fifth lens L5 having a negative refractive power. Optical elements such as a filter GF and the like may be provided between the fifth lens L5 and an image surface Si.

In this embodiment, an overall focal length of the camera optical lens system is defined as f, a focal length of the first lens is defined as f1, and the camera optical lens 10 satisfies a condition of $0.40 \leq f1/f \leq 0.48$, which specifies a ratio of the focal length of the first lens L1 to the overall focal length of the system. Within this range, the spherical difference and the field curvature of the system can be effectively balanced.

A focal length of the second lens L2 is defined as f2, and the camera optical lens 10 satisfies a condition of $-0.75 \leq f2/f \leq -0.50$, which specifies a ratio of the focal length of the second lens L2 to the overall focal length of the system. Within this range, the performance of the optical system can be improved.

A focal length of the fourth lens L4 is defined as f4, and the camera optical lens 10 satisfies a condition of $1.20 \leq f4/f \leq 3.20$, with which the optical power of the fourth lens L4 can be effectively distributed, and the aberration of the optical system can be corrected, and thus the imaging quality is improved.

A focal length of the fifth lens L5 is defined as f5, and the camera optical lens 10 satisfies a condition of $-1.40 \leq f5/f \leq -1.10$, which specifies a ratio of the focal length of the fifth lens L5 to the overall focal length of the system. With reasonable distribution of the focal lengths, the system has better imaging quality and lower sensitivity.

An on-axis thickness of the first lens L1 is defined as d1, on-axis distance from the image-side surface of the first lens L1 to the object-side surface of the second lens L2 is defined as d2, and the camera optical lens 10 satisfies a condition of $6.00 \leq d1/d2 \leq 8.00$, which specifies a ratio between the thickness of the first lens L1 and the gap between the first lens L1 and the second lens L2. Within this range, the reduction of the overall length of the optical system is facilitated and ultra-thin effect is achieved.

A curvature radius of the object-side surface of the third lens L3 is defined as R5, a curvature radius of the image-side surface of the third lens L3 is defined as R6, and the camera optical lens 10 satisfies a condition of $0.80 \leq (R5+R6)/(R5-R6) \leq 6.50$, which specifies a shape of the third lens L3. Within this range, the deflection degree of the light passing through the lens can be alleviated, and the aberration can be effectively reduced.

A curvature radius of the object-side surface of the fourth lens L4 is defined as R7, a curvature radius of the image-side surface of the fourth lens L4 is defined as R8, and the camera optical lens 10 further satisfies a condition of $3.00 \leq (R7+R8)/(R7-R8) \leq 10.00$, which specifies a shape of the fourth lens L4. Within this range, correction of the off-axis aberration is facilitated.

A focal length of the third lens L3 is defined as f3, and the camera optical lens 10 further satisfies a condition of $-10.00 \leq f3/f \leq -0.80$, which specifies a ratio of the focal length of the third lens L3 to the overall focal length of the system. With reasonable distribution of the focal lengths, the system has better imaging quality and lower sensitivity.

A curvature radius of an object-side surface of the first lens L1 is defined as R1, a curvature radius of an image-side surface of the first lens L1 is defined as R2, and the camera optical lens 10 further satisfies a condition of $-1.71 \leq (R1+R2)/(R1-R2) \leq -0.39$. This can reasonably control a shape of the first lens L1 in such a manner that the first lens L1 can effectively correct a spherical aberration of the camera optical lens.

An on-axis thickness of the first lens L1 is defined as d1, a overall optical length from the object side surface of the first lens L1 to an image surface Si of the camera optical lens 10 along an optical axis is defined as TTL, and the camera optical lens 10 further satisfies a condition of $0.08 \leq d1/TTL \leq 0.31$. This can facilitate achieving ultra-thinness of the lenses. Typically, the camera optical lens 10 further satisfies a condition of $0.13 \leq d1/TTL \leq 0.25$.

A curvature radius of the object-side surface of the second lens L2 is defined as R3, a curvature radius of the image-side surface of the second lens L2 is defined as R4, and the camera optical lens 10 further satisfies a condition of $0.41 \leq (R3+R4)/(R3-R4) \leq 4.41$, which specifies a shape of the second lens L2. Within this range, the development of the lenses towards ultra-thinness and wide angle would facilitate correction the on-axis aberration.

An on-axis thickness of the second lens L2 is defines as d3, the overall optical length of the camera optical lens 10 is defined as TTL, and the camera optical lens 10 further satisfies a condition of $0.02 \leq d3/TTL \leq 0.07$. This can facilitate achieving ultra-thinness of the lenses. Typically, the camera optical lens 10 further satisfies a condition of $0.04 \leq d3/TTL \leq 0.06$.

An on-axis thickness of the third lens L3 is defined as d5, the overall optical length of the camera optical lens 10 is defined as TTL, and the camera optical lens 10 further satisfies a condition of $0.02 \leq d5/TTL \leq 0.08$. This can facilitate achieving ultra-thinness of the lenses. Typically, the camera optical lens 10 further satisfies a condition of $0.03 \leq d5/TTL \leq 0.06$.

An on-axis thickness of the fourth lens L4 is defined as d7, the overall optical length of the camera optical lens 10 is defined as TTL, and the camera optical lens 10 further satisfies a condition of $0.05 \leq d7/TTL \leq 0.16$. This can facilitate achieving ultra-thinness of the lenses. Typically, the camera optical lens 10 further satisfies a condition of $0.07 \leq d7/TTL \leq 0.13$.

A curvature radius of the object-side surface of the fifth lens L5 is defined as R9, a curvature radius of the image-side surface of the fifth lens L5 is defined as R10, and the camera optical lens 10 further satisfies a condition of $-6.99 \leq (R9+R10)/(R9-R10) \leq -0.55$, which specifies a shape of the fifth lens L5. Within this range, the development of the lenses towards ultra-thinness and wide angle would facilitate correction the off-axis aberration.

An on-axis thickness of the fifth lens L5 is defined as d9, the overall optical length of the camera optical lens 10 is defined as TTL, and the camera optical lens 10 further satisfies a condition of $0.03 \leq d9/TTL \leq 0.09$. This can facilitate achieving ultra-thinness of the lenses. Typically, the camera optical lens 10 further satisfies a condition of $0.04 \leq d9/TTL \leq 0.07$.

A combined focal length of the first lens L1 and the second lens L2 is defined as f12, and the camera optical lens 10 further satisfies a condition of $0.34 \leq f12/f \leq 1.23$. Within this range, the aberration and distortion of the camera optical lens 10 can be eliminated, and a back focal length of the camera optical lens 10 can be suppressed to maintain the miniaturization of the image lens system.

Further, the overall optical length of the camera optical lens 10 is defined as TTL, the overall focal length of the camera optical lens system is defined as f, and the camera optical lens 10 further satisfies a condition of $f/TTL \geq 1.09$. This can facilitate achieving ultra-thinness of the lenses. An F number of the camera optical lens 10 is defined as Fno, which indicates a ratio of an effective focal length and an entrance pupil diameter and satisfies a condition of $Fno \leq 2.55$. This facilitates achieving large aperture of the lenses and thus better imaging performance. That is, when the above relationships are satisfied, the camera optical lens 10 meets the design requirements of long focal length and ultra-thinness while having excellent optical imaging performance. Based on the characteristics of the camera optical lens 10, the camera optical lens 10 is particularly applicable to mobile camera lens assemblies and a WEB camera lenses composed of such camera elements as CCD and CMOS for high pixels.

The camera optical lens 10 will be further described with reference to the following examples. Symbols used in various examples are shown as follows. The focal length, on-axis distance, curvature radius, on-axis thickness, inflexion point position, and arrest point position are all in units of mm.

TTL: Overall optical length (the distance from the object side surface of the first lens L1 to the image surface of the camera optical lens along the optical axis) in mm.

Typically, inflexion points and/or arrest points can be arranged on the object-side surface and/or the image-side surface of each lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|  | R |  | d | nd |  | vd |  |
|---|---|---|---|---|---|---|---|
| S1 | ∞ | d0 = | −0.496 |  |  |  |  |
| R1 | 1.723 | d1 = | 0.928 | nd1 | 1.5444 | v1 | 55.82 |
| R2 | −22.226 | d2 = | 0.118 |  |  |  |  |
| R3 | 3.018 | d3 = | 0.277 | nd2 | 1.6700 | v2 | 19.39 |
| R4 | 1.487 | d4 = | 0.449 |  |  |  |  |
| R5 | 87.862 | d5 = | 0.298 | nd3 | 1.5444 | v3 | 55.82 |
| R6 | 24.552 | d6 = | 1.523 |  |  |  |  |
| R7 | −3.686 | d7 = | 0.582 | nd4 | 1.6700 | v4 | 19.39 |
| R8 | −3.015 | d8 = | 0.099 |  |  |  |  |
| R9 | −4.154 | d9 = | 0.326 | nd5 | 1.5444 | v5 | 55.82 |
| R10 | 42.264 | d10 = | 0.534 |  |  |  |  |
| R11 | ∞ | d11 = | 0.210 | ndg | 1.5168 | vg | 64.17 |
| R12 | ∞ | d12 = | 0.372 |  |  |  |  |

In the table, meanings of various symbols will be described as follows.

S1: aperture;

R: curvature radius of an optical surface, a central curvature radius for a lens;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of an object-side surface of the optical filter GF;

R12: curvature radius of an image-side surface of the optical filter GF;

d: on-axis thickness of a lens and an on-axis distance between lens;

Table 2 shows aspherical surface data of the camera optical lens 10 in Embodiment 1 of the present disclosure.

TABLE 2

| | Conic coefficient | Aspheric surface coefficients | | | |
|---|---|---|---|---|---|
| | k | A4 | A6 | A8 | A10 |
| R1 | −1.7980E−01 | 6.0200E−03 | −1.0060E−02 | 3.7430E−02 | −7.3090E−02 |
| R2 | 5.8121E+01 | 5.6100E−03 | 1.2272E−01 | −2.9976E−01 | 4.4509E−01 |
| R3 | −2.2515E+01 | −3.9620E−02 | 2.5731E−01 | −6.8081E−01 | 1.5244E+00 |
| R4 | 9.8615E−01 | −2.2869E−01 | 5.1457E−01 | −2.1082E+00 | 8.6195E+00 |
| R5 | 9.9900E+01 | 7.3810E−02 | 6.0480E−02 | 3.6130E−01 | −1.0315E+00 |
| R6 | 9.9000E+01 | 1.0248E−01 | 1.6812E−01 | −4.7008E−01 | 1.9855E+00 |
| R7 | −4.0713E+00 | −7.9010E−02 | 2.0185E−01 | −5.2189E−01 | 7.2512E−01 |
| R8 | 1.6932E+00 | −2.1715E−01 | 5.2027E−01 | −7.7750E−01 | 6.9742E−01 |
| R9 | 4.6095E−01 | −3.9425E−01 | 6.6379E−01 | −7.4271E−01 | 5.4055E−01 |
| R10 | −9.9000E+01 | −1.7349E−01 | 1.4049E−01 | −7.1840E−02 | 2.2260E−02 |

| | Aspheric surface coefficients | | | | |
|---|---|---|---|---|---|
| | A12 | A14 | A16 | A18 | A20 |
| R1 | 8.5890E−02 | −5.9670E−02 | 2.3590E−02 | −4.6000E−03 | 2.8000E−04 |
| R2 | −4.1270E−01 | 2.2439E−01 | −5.9680E−02 | 1.5000E−03 | 1.8500E−03 |
| R3 | −2.4700E+00 | 2.7216E+00 | −1.9565E+00 | 8.2073E−01 | −1.5071E−01 |
| R4 | −2.3736E+01 | 4.1976E+01 | −4.5857E+01 | 2.7984E+01 | −7.3027E+00 |
| R5 | 1.8156E+00 | −1.9902E+00 | 1.2529E+00 | −4.1476E−01 | 5.7600E−02 |
| R6 | −5.1858E+00 | 8.4931E+00 | −8.3836E+00 | 4.5519E+00 | −1.0462E+00 |
| R7 | −6.2311E−01 | 3.4067E−01 | −1.1642E−01 | 2.2770E−02 | −1.9300E−03 |
| R8 | −3.9637E−01 | 1.4715E−01 | −3.5400E−02 | 5.0800E−03 | −3.3000E−04 |
| R9 | −2.5070E−01 | 7.2870E−02 | −1.2750E−02 | 1.2200E−03 | −5.0000E−05 |
| R10 | −4.4600E−03 | 6.2000E−04 | −7.0000E−05 | 1.0000E−05 | 0.0000E+00 | d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the optical filter GF;

d11: on-axis thickness of the optical filter GF;

d12: on-axis distance from the image-side surface to the image surface of the optical filter GF;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

vg: abbe number of the optical filter GF.

In table 2, K is a conic coefficient, and A4, A6, A8, A10, A12, A14, A16, A18 and A20 are aspheric surface coefficients.

$$y = (x^2/R)/[1+\{1-(k+1)(x^2/R^2)\}^{1/2}] + A4x^4 + A6x^6 + A8x^8 + A10x^{10} + A12x^{12} + A14x^{14} + A16x^{16} + A18x^{18} + A20x^{20} \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of each lens of the camera optical lens 10 according to Embodiment 1. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 |
|---|---|---|
| P1R1 | 0 | 0 |
| P1R2 | 1 | 0.375 |

TABLE 3-continued

| | Number(s) of inflexion points | Inflexion point position 1 |
|---|---|---|
| P2R1 | 1 | 0.995 |
| P2R2 | 0 | 0 |
| P3R1 | 0 | 0 |
| P3R2 | 0 | 0 |
| P4R1 | 1 | 1.415 |
| P4R2 | 1 | 1.585 |
| P5R1 | 1 | 1.565 |
| P5R2 | 1 | 0.115 |

TABLE 4

| | Number(s) of arrest points | Arrest point position 1 |
|---|---|---|
| P1R1 | 0 | 0 |
| P1R2 | 1 | 0.625 |
| P2R1 | 0 | 0 |
| P2R2 | 0 | 0 |
| P3R1 | 0 | 0 |
| P3R2 | 0 | 0 |
| P4R1 | 0 | 0 |
| P4R2 | 0 | 0 |
| P5R1 | 0 | 0 |
| P5R2 | 1 | 0.185 |

Figure 2:
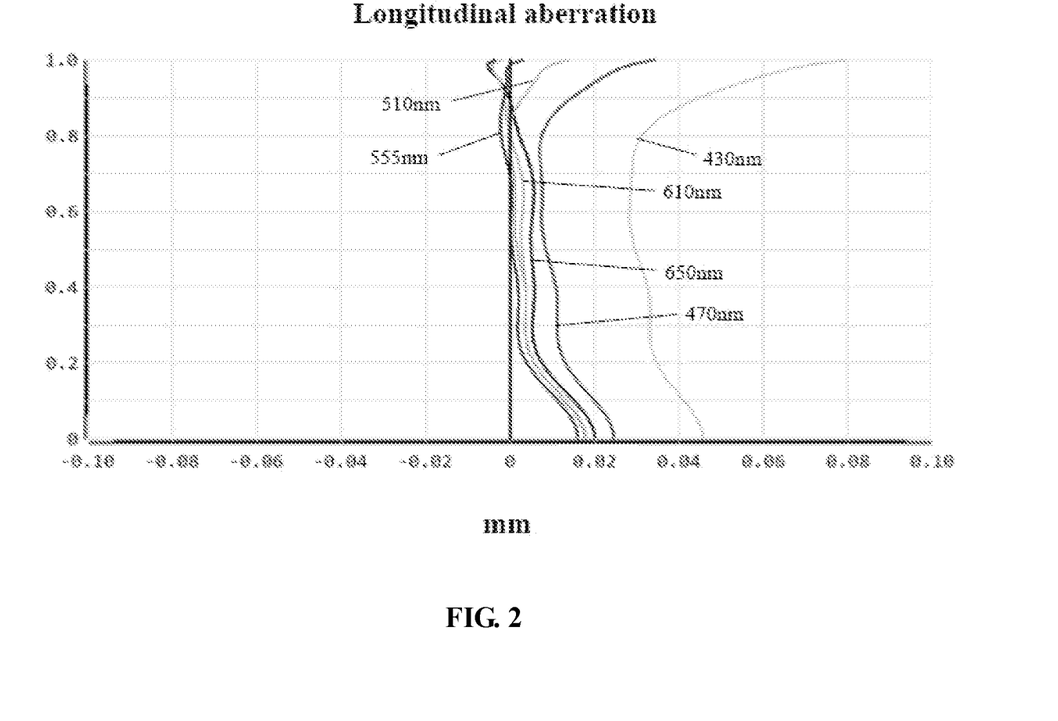
FIG. 2 is a schematic diagram of a longitudinal aberration of the camera optical lens shown in FIG. 1.
Figure 3:
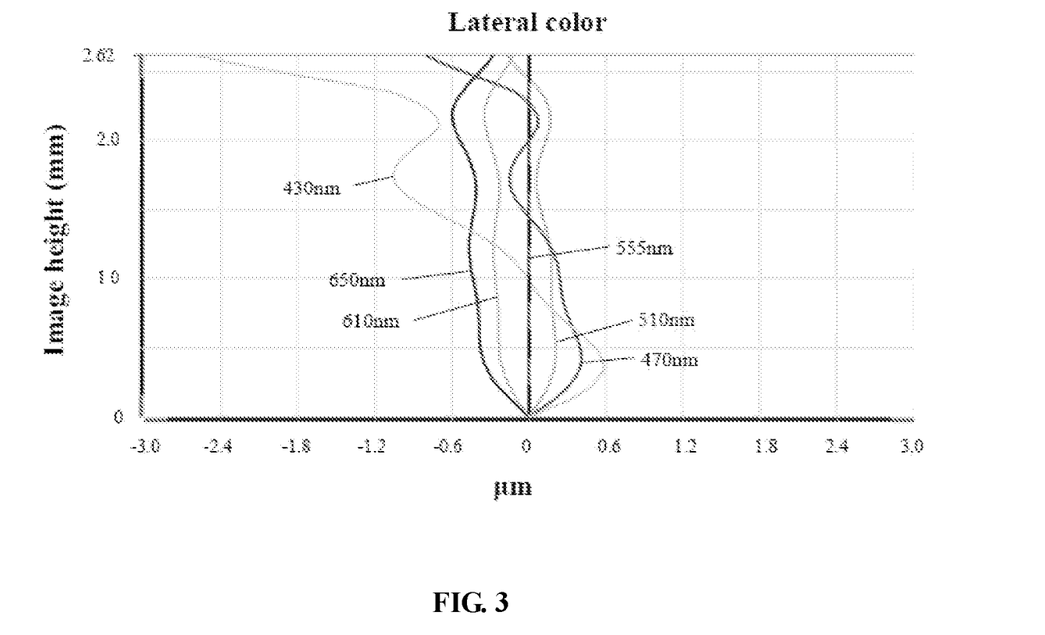
FIG. 3 is a schematic diagram of a lateral color of the camera optical lens shown in FIG. 1.
Figure 4:
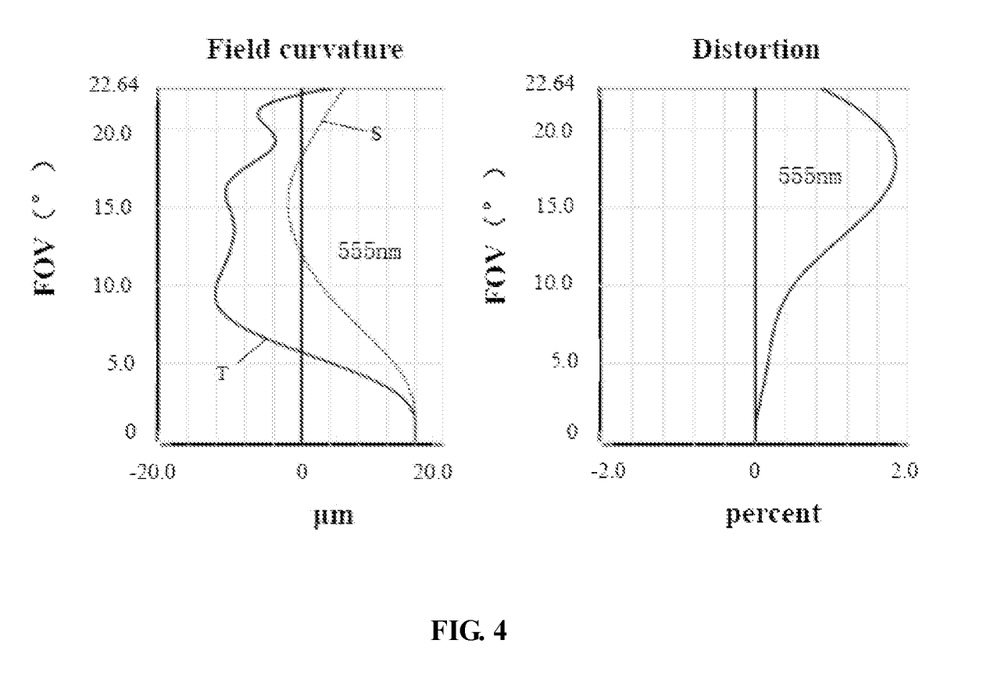
FIG. 4 is a schematic diagram of a field curvature and a distortion of the camera optical lens shown in FIG. 1.

FIG. 2 illustrates a longitudinal aberration of light with wavelengths of 430 nm, 470 nm, 510 nm, 555 nm, 610 nm and 650 nm after passing the camera optical lens 10, respectively. FIG. 3 illustrates a lateral color of light with wavelengths of 430 nm, 470 nm, 510 nm, 555 nm, 610 nm and 650 nm after passing the camera optical lens 10, respectively. FIG. 4 illustrates a field curvature and a distortion with a wavelength of 555 nm after passing the camera optical lens 10. A field curvature S in FIG. 4 is a field curvature in a sagittal direction, and T is a field curvature in a tangential direction.

In the subsequent Table 13, various parameters of Embodiments 1, 2 and 3 and values corresponding to the parameters specified in the above conditions are shown.

As shown in Table 13, Embodiment 1 satisfies the various conditions.

In this Embodiment, an entrance pupil diameter of the camera optical lens 10 is 2.520 mm, an image height of 1.0H is 2.619 mm, and an FOV (field of view) in a diagonal direction is 45.28°. Thus, the camera optical lens 10 achieves long focal length and ultra-thinness, the on-axis and off-axis aberration is sufficiently corrected, thereby achieving excellent optical performance.

Embodiment 2

Figure 5:
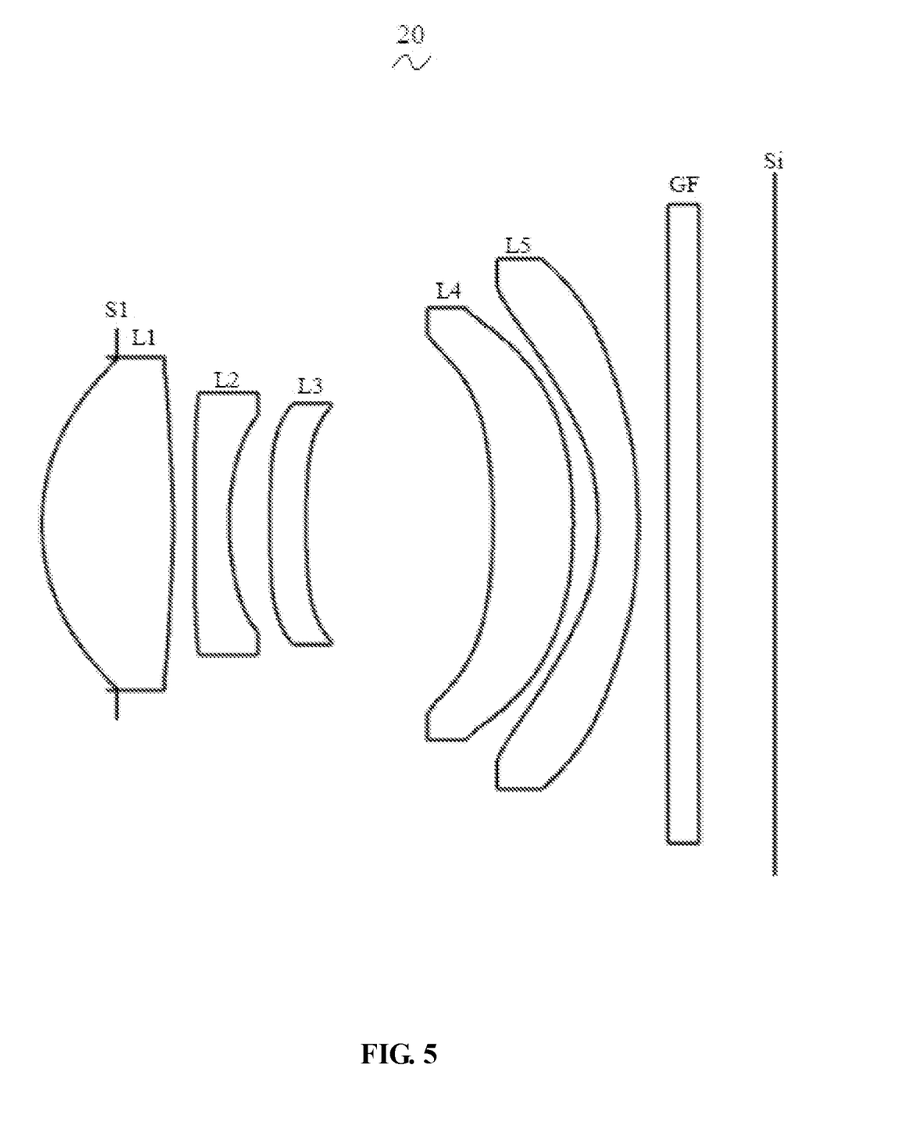
FIG. 5 is a schematic diagram of a structure of a camera optical lens according to Embodiment 2 of the present disclosure.

Embodiment 2, which provides a camera optical lens 20 structurally shown in FIG. 5, is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | | nd | | vd |
|---|---|---|---|---|---|---|
| S1 | ∞ | d0 = | −0.505 | | | |
| R1 | 1.434 | d1 = | 0.888 | nd1 | 1.5444 | v1 | 55.82 |
| R2 | −5.468 | d2 = | 0.147 | | | |
| R3 | 206.050 | d3 = | 0.230 | nd2 | 1.6355 | v2 | 23.97 |
| R4 | 1.745 | d4 = | 0.277 | | | |
| R5 | 10.442 | d5 = | 0.243 | nd3 | 1.5444 | v3 | 55.82 |
| R6 | 7.657 | d6 = | 1.263 | | | |
| R7 | −4.161 | d7 = | 0.541 | nd4 | 1.6713 | v4 | 19.24 |
| R8 | −3.237 | d8 = | 0.168 | | | |
| R9 | −1.984 | d9 = | 0.270 | nd5 | 1.5444 | v5 | 55.82 |
| R10 | −4.630 | d10 = | 0.200 | | | |
| R11 | ∞ | d11 = | 0.210 | ndg | 1.5168 | vg | 64.17 |
| R12 | ∞ | d12 = | 0.512 | | | |

Table 6 shows aspherical surface data of each lens of the camera optical lens 20 in Embodiment 2 of the present disclosure.

TABLE 6

| | Conic coefficient | Aspheric surface coefficients | | | | |
|---|---|---|---|---|---|---|
| | k | A4 | A6 | A8 | A10 | A12 |
| R1 | −1.1372E−01 | −2.3600E−03 | 2.4607E−02 | −1.3939E−01 | 4.0011E−01 | −6.9444E−01 |
| R2 | −8.6488E+01 | 2.1782E−02 | 3.1482E−02 | −1.3816E−01 | 1.7554E−01 | 6.9278E−02 |
| R3 | 9.9000E+01 | −3.5760E−02 | 2.6694E−01 | −5.1686E−01 | 6.5367E−01 | −1.8574E−01 |
| R4 | 2.6155E+00 | −1.9672E−01 | 5.4204E−01 | −1.1644E+00 | 4.6290E+00 | −1.5137E+01 |
| R5 | 9.9900E+01 | 8.4970E−02 | 2.5435E−01 | 4.2313E−01 | −3.2440E+00 | 1.2047E+01 |
| R6 | 7.7712E+01 | 1.6461E−01 | 2.4840E−01 | −3.7799E−01 | 3.6789E−01 | 2.2782E+00 |
| R7 | −7.9551E+00 | −1.0175E−01 | 1.4730E−01 | −4.7073E−01 | 9.0044E−01 | −1.3030E+00 |
| R8 | 2.0897E+00 | −1.7714E−01 | 2.8407E−01 | −3.7761E−01 | 3.8027E−01 | −3.1612E−01 |
| R9 | −8.1108E−01 | −3.3123E−01 | 5.7043E−01 | −4.6916E−01 | 2.7620E−01 | −1.7220E−01 |
| R10 | 1.6458E+00 | −1.7515E−01 | 2.3847E−01 | −1.7277E−01 | 8.7314E−02 | −3.7830E−02 |

| | Aspheric surface coefficients | | | |
|---|---|---|---|---|
| | A14 | A16 | A18 | A20 |
| R1 | 7.3607E−01 | −4.7577E−01 | 1.7311E−01 | −2.7880E−02 |
| R2 | −5.6981E−01 | 7.9121E−01 | −4.8717E−01 | 1.1557E−01 |
| R3 | −9.3107E−01 | 1.5975E+00 | −1.0646E+00 | 2.5942E−01 |
| R4 | 3.3724E+01 | −4.5835E+01 | 3.3822E+01 | −1.0358E+01 |
| R5 | −2.6738E+01 | 3.5187E+01 | −2.5121E+01 | 7.4229E+00 |
| R6 | −1.1520E+01 | 2.3333E+01 | −2.2537E+01 | 8.4837E+00 |

TABLE 6-continued

| | | | | |
|---|---|---|---|---|
| R7 | 1.3510E+00 | −9.0356E−01 | 3.3714E−01 | −5.2010E−02 |
| R8 | 1.9098E−01 | −7.2890E−02 | 1.4867E−02 | −1.1200E−03 |
| R9 | 9.9318E−02 | −3.6970E−02 | 7.3210E−03 | −5.9000E−04 |
| R10 | 1.3293E−02 | −3.1500E−03 | 4.1700E−04 | −2.2861E−05 |

Table 7 and table 8 show design data of inflexion points and arrest points of each lens of the camera optical lens 20 in Embodiment 2 of the present disclosure.

TABLE 7

| | Number(s) of inflexion points | Inflexion point position 1 | Inflexion point position 2 |
|---|---|---|---|
| P1R1 | 1 | 1.105 | 0 |
| P1R2 | 2 | 0.625 | 0.655 |
| P2R1 | 2 | 0.125 | 0.225 |
| P2R2 | 0 | 0 | 0 |
| P3R1 | 0 | 0 | 0 |
| P3R2 | 0 | 0 | 0 |
| P4R1 | 1 | 1.185 | 0 |
| P4R2 | 1 | 1.375 | 0 |
| P5R1 | 2 | 1.315 | 1.755 |
| P5R2 | 1 | 1.905 | 0 |

TABLE 8

| | Number of arrest points | Arrest point position 1 | Arrest point position 2 |
|---|---|---|---|
| P1R1 | 0 | 0 | 0 |
| P1R2 | 0 | 0 | 0 |
| P2R1 | 0 | 0 | 0 |
| P2R2 | 0 | 0 | 0 |
| P3R1 | 0 | 0 | 0 |
| P3R2 | 0 | 0 | 0 |
| P4R1 | 0 | 0 | 0 |
| P4R2 | 0 | 0 | 0 |
| P5R1 | 2 | 1.725 | 1.765 |
| P5R2 | 0 | 0 | 0 |

Figure 6:
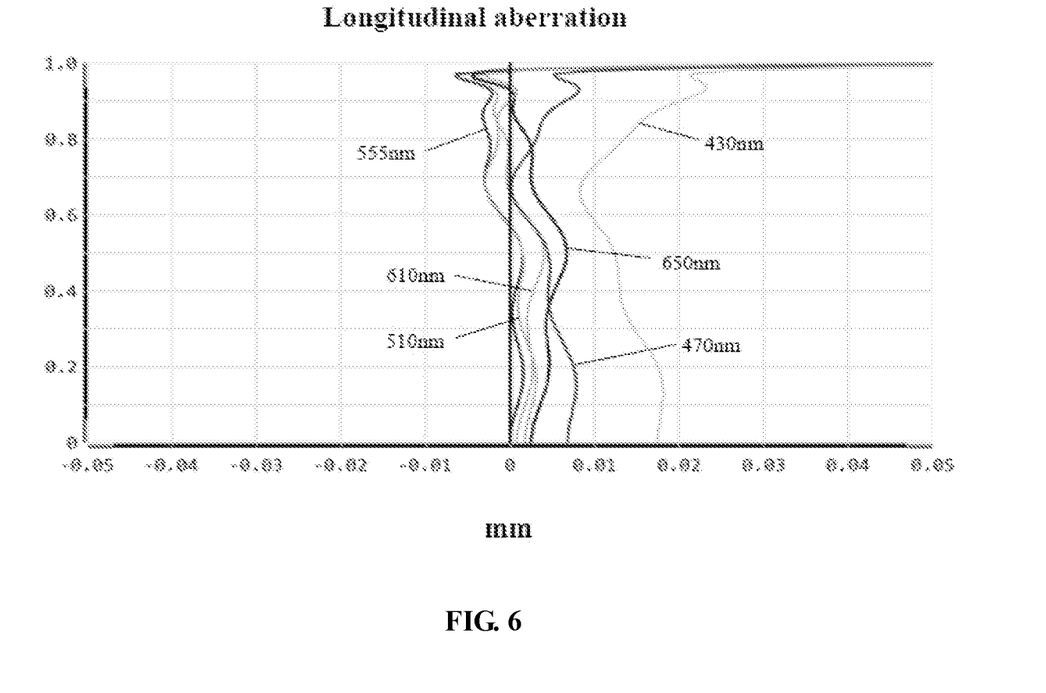
FIG. 6 is a schematic diagram of a longitudinal aberration of the camera optical lens shown in FIG. 5.
Figure 7:
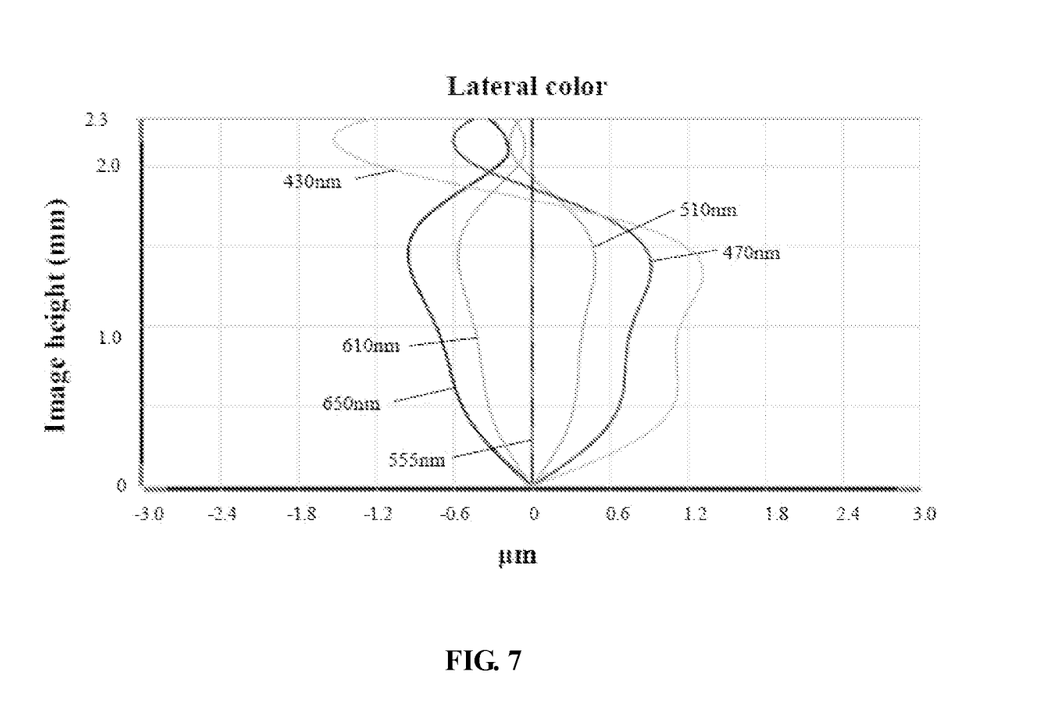
FIG. 7 is a schematic diagram of a lateral color of the camera optical lens shown in FIG. 5.
Figure 8:
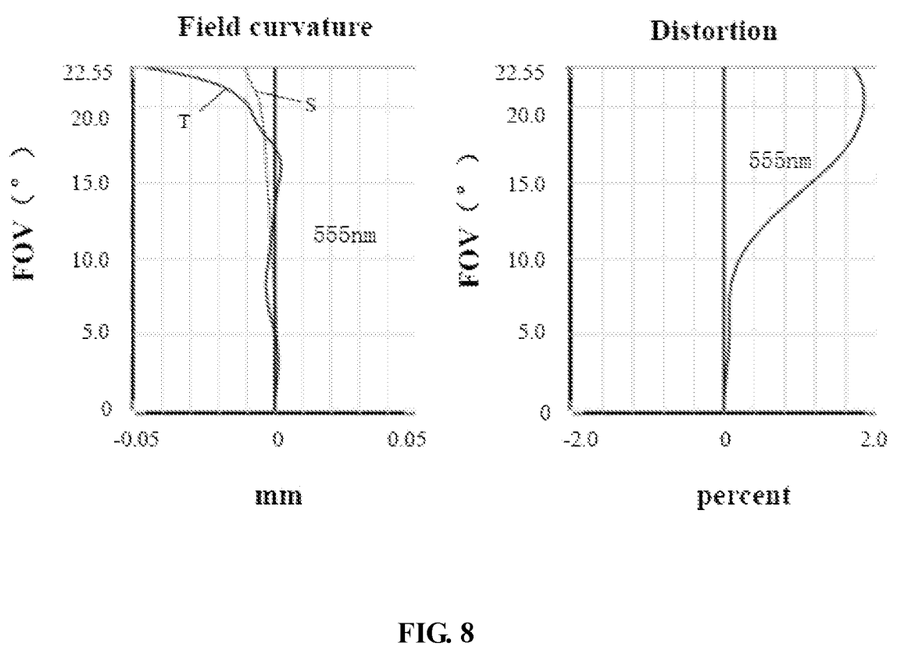
FIG. 8 is a schematic diagram of a field curvature and a distortion of the camera optical lens shown in FIG. 5.

FIG. 6 illustrates a longitudinal aberration of light with wavelengths of 430 nm, 470 nm, 510 nm, 555 nm, 610 nm and 650 nm after passing the camera optical lens 20. FIG. 7 illustrates a lateral color of light with wavelengths of 430 nm, 470 nm, 510 nm, 555 nm, 610 nm and 650 nm after passing the camera optical lens 20. FIG. 8 illustrates a field curvature and a distortion of light with a wavelength of 555 nm after passing the camera optical lens 20.

As shown in Table 13, Embodiment 2 satisfies the various conditions.

In this embodiment, an entrance pupil diameter of the camera optical lens 20 is 2.269 mm, an image height of 1.0H is 2.300 mm, and an FOV (field of view) in the diagonal direction is 45.10°. Thus, the camera optical lens 20 achieves long focal length and ultra-thinness, the on-axis and off-axis aberration is sufficiently corrected, thereby achieving excellent optical performance.

Embodiment 3

Figure 9:
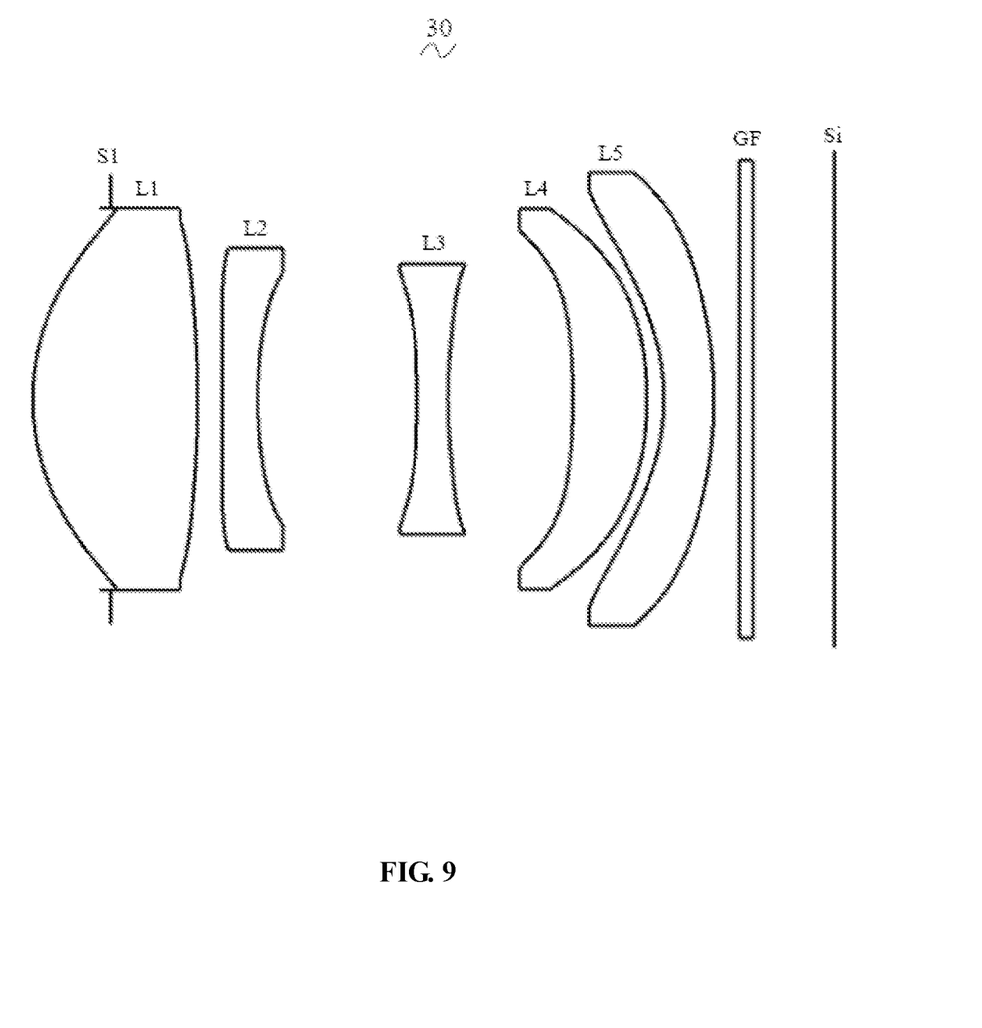
FIG. 9 is a schematic diagram of a structure of a camera optical lens according to Embodiment 3 of the present disclosure.

Embodiment 3, which provides a camera optical lens 30 structurally shown in FIG. 9, is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

| | R | d | | nd | | vd | |
|---|---|---|---|---|---|---|---|
| S1 | ∞ | d0 = | −0.623 | | | | |
| R1 | 1.923 | d1 = | 1.311 | nd1 | 1.5444 | v1 | 55.82 |
| R2 | −8.447 | d2 = | 0.202 | | | | |
| R3 | −35.282 | d3 = | 0.280 | nd2 | 1.6710 | v2 | 19.24 |
| R4 | 3.586 | d4 = | 1.265 | | | | |
| R5 | −33.304 | d5 = | 0.250 | nd3 | 1.5440 | v3 | 56.00 |
| R6 | 3.639 | d6 = | 0.994 | | | | |
| R7 | −6.459 | d7 = | 0.587 | nd4 | 1.6710 | v4 | 19.24 |
| R8 | −3.252 | d8 = | 0.137 | | | | |
| R9 | −2.307 | d9 = | 0.399 | nd5 | 1.5352 | v5 | 56.12 |
| R10 | −4.155 | d10 = | 0.200 | | | | |
| R11 | ∞ | d11 = | 0.110 | ndg | 1.5168 | vg | 64.17 |
| R12 | ∞ | d12 = | 0.655 | | | | |

Table 10 shows aspherical surface data of each lens of the camera optical lens 30 in Embodiment 3 of the present disclosure.

TABLE 10

| | Conic coefficient | Aspheric surface coefficients | | | |
|---|---|---|---|---|---|
| | k | A4 | A6 | A8 | A10 |
| R1 | 1.7800E−01 | −6.8800E−03 | −3.5500E−03 | −1.0900E−03 | 3.0090E−03 |
| R2 | −3.5001E+01 | 9.9720E−03 | −2.2450E−02 | 4.8556E−02 | −7.9920E−02 |
| R3 | 9.5718E+01 | 5.3600E−03 | −1.0290E−02 | 1.1801E−01 | −2.5968E−01 |
| R4 | 7.6551E+00 | −2.5790E−02 | 5.6050E−03 | 1.1194E−01 | −2.7790E−01 |
| R5 | −9.9000E+01 | −2.0597E−01 | 1.5597E−01 | −1.5941E−01 | 3.6993E−01 |
| R6 | −3.3774E+01 | −7.5470E−02 | 1.0508E−01 | −1.0941E−01 | 2.8268E−01 |
| R7 | 1.7253E+01 | −7.2830E−02 | 1.9591E−01 | −7.5406E−01 | 1.6624E+00 |
| R8 | 2.9473E+00 | −2.1352E−01 | 4.4872E−01 | −6.2265E−01 | 5.9700E−01 |
| R9 | −2.8357E+00 | −3.1398E−01 | 6.5239E−01 | −6.6770E−01 | 3.7116E−01 |
| R10 | 8.4463E−01 | −7.8350E−02 | 1.4548E−01 | −1.4657E−01 | 9.6955E−02 |
| | Aspheric surface coefficients | | | | |
| | A12 | A14 | A16 | A18 | A20 |
| R1 | −5.4600E−03 | 4.4000E−03 | −2.0600E−03 | 5.0200E−04 | −5.2000E−05 |

TABLE 10-continued

| | | | | | |
|---|---|---|---|---|---|
| R2  | 8.0769E−02  | −5.1990E−02 | 2.0669E−02  | −4.6100E−03 | 4.3818E−04  |
| R3  | 3.3407E−01  | −2.6933E−01 | 1.3466E−01  | −3.7900E−02 | 4.5686E−03  |
| R4  | 4.1264E−01  | −3.9020E−01 | 2.3251E−01  | −7.6910E−02 | 1.0996E−02  |
| R5  | −5.9129E−01 | 3.9277E−01  | 1.3470E−01  | −3.2614E−01 | 1.2504E−01  |
| R6  | −4.1457E−01 | 2.6595E−01  | 2.7552E−02  | −1.2116E−01 | 4.3234E−02  |
| R7  | −2.2607E+00 | 1.8876E+00  | −9.3803E−01 | 2.5344E−01  | −2.8480E−02 |
| R8  | −4.2289E−01 | 2.0812E−01  | −6.2570E−02 | 9.4660E−03  | −4.4519E−04 |
| R9  | −1.0423E−01 | 7.0800E−03  | 3.6390E−03  | −9.3000E−04 | 6.7400E−05  |
| R10 | −4.4960E−02 | 1.3879E−02  | −2.6100E−03 | 2.6000E−04  | −9.7600E−06 |

Table 11 and Table 12 show design data inflexion points and arrest points of each lens in the camera optical lens 30 in Embodiment 3 of the present disclosure.

TABLE 11

| | Number(s) of inflexion points | Inflexion point position 1 |
|---|---|---|
| P1R1 | 1 | 1.395 |
| P1R2 | 0 | 0 |
| P2R1 | 1 | 0.455 |
| P2R2 | 0 | 0 |
| P3R1 | 1 | 1.005 |
| P3R2 | 0 | 0 |
| P4R1 | 1 | 1.305 |
| P4R2 | 1 | 1.485 |
| P5R1 | 1 | 1.315 |
| P5R2 | 1 | 1.915 |

TABLE 12

| | Number of arrest points | Arrest point position 1 |
|---|---|---|
| P1R1 | 0 | 0 |
| P1R2 | 0 | 0 |
| P2R1 | 1 | 0.685 |
| P2R2 | 0 | 0 |
| P3R1 | 0 | 0 |
| P3R2 | 0 | 0 |
| P4R1 | 0 | 0 |
| P4R2 | 0 | 0 |
| P5R1 | 1 | 1.825 |
| P5R2 | 0 | 0 |

Figure 10:
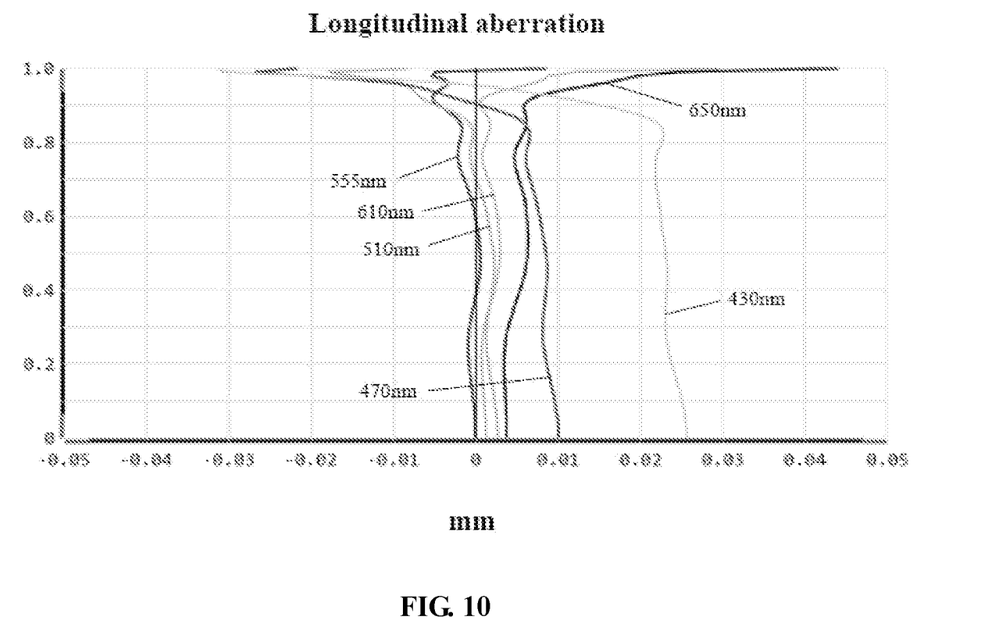
FIG. 10 is a schematic diagram of a longitudinal aberration of the camera optical lens shown in FIG. 9.
Figure 11:
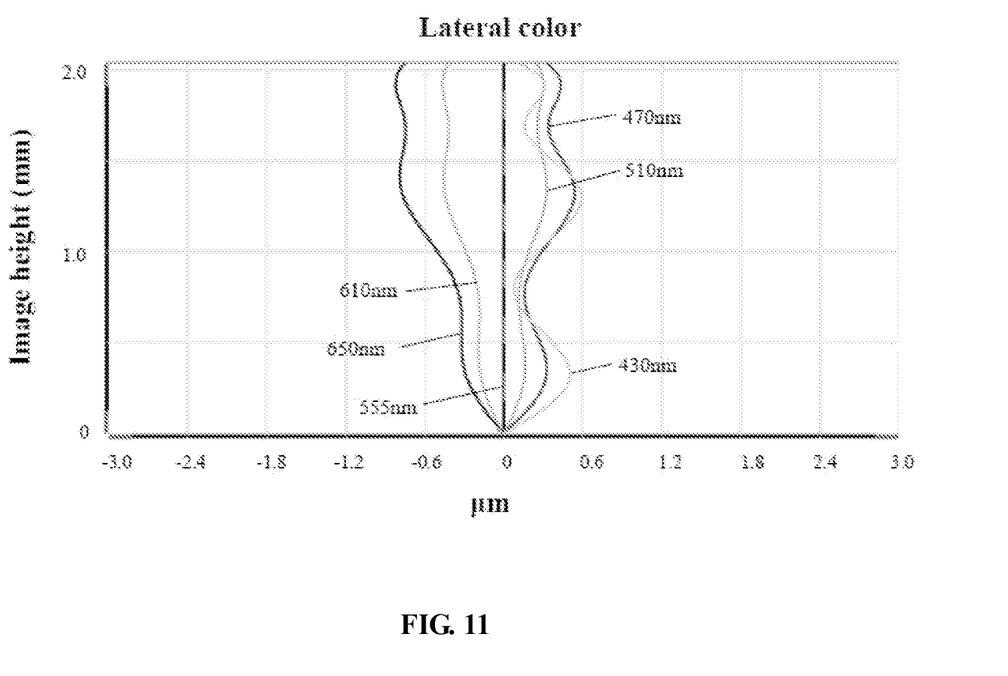
FIG. 11 is a schematic diagram of a lateral color of the camera optical lens shown in FIG. 9.
Figure 12:
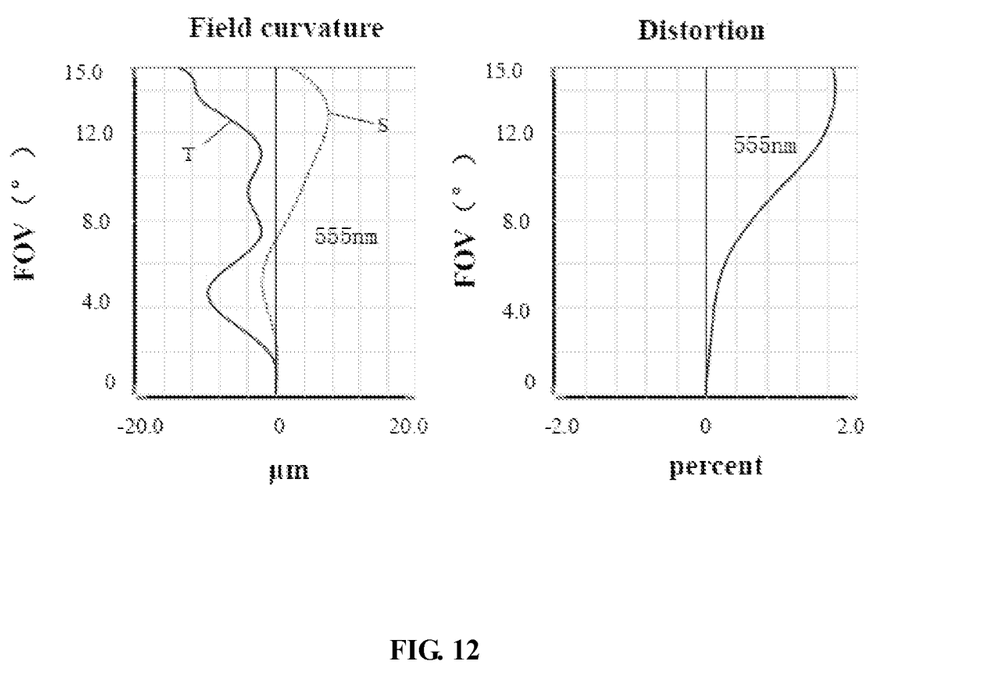
FIG. 12 is a schematic diagram of a field curvature and a distortion of the camera optical lens shown in FIG. 9.

FIG. 10 illustrates a longitudinal aberration of light with wavelengths of 430 nm, 470 nm, 510 nm, 555 nm, 610 nm and 650 nm after passing the camera optical lens 30. FIG. 11 illustrates a lateral color of light with wavelengths of 430 nm, 470 nm, 510 nm, 555 nm, 610 nm and 650 nm after passing the camera optical lens 30. FIG. 12 illustrates a field curvature and a distortion of light with a wavelength of 555 nm after passing the camera optical lens 30.

Table 13 in the following shows values corresponding to the conditions according to the aforementioned conditions in the present embodiment. Apparently, the camera optical system in the present embodiment satisfies the aforementioned conditions.

In this embodiment, an entrance pupil diameter of the camera optical lens 30 is 3.119 mm, an image height of 1.0H is 2.040 mm, and an FOV (field of view) in the diagonal direction is 30.00°. Thus, the camera optical lens 30 achieves long focal length and ultra-thinness, the on-axis and off-axis aberration is sufficiently corrected, thereby achieving excellent optical performance.

TABLE 13

| Parameters and conditions | Embodiment 1 | Embodiment 2 | Embodiment 3 |
|---|---|---|---|
| f | 6.250 | 5.447 | 7.487 |
| f1 | 2.969 | 2.179 | 3.002 |
| f2 | −4.676 | −2.750 | −4.792 |
| f3 | −62.488 | −54.247 | −5.996 |
| f4 | 18.132 | 17.400 | 9.005 |
| f5 | −6.908 | −6.592 | −10.451 |
| f12 | 5.064 | 4.483 | 5.019 |
| f1/f | 0.48 | 0.40 | 0.40 |
| f2/f | −0.75 | −0.51 | −0.64 |
| f4/f | 2.90 | 3.19 | 1.20 |
| f5/f | −1.11 | −1.21 | −1.40 |
| d1/d2 | 7.86 | 6.04 | 6.49 |
| (R5 + R6)/(R5 − R6) | 1.78 | 6.50 | 0.80 |
| (R7 + R8)/(R7 − R8) | 9.99 | 8.01 | 3.03 |
| Fno | 2.48 | 2.40 | 2.40 |

It will be understood by those of ordinary skill in the art that the embodiments described above are specific embodiments realizing the present disclosure, and that in practical applications, various changes may be made thereto in form and in detail without departing from the range and scope of the disclosure.

What is claimed is:

1. A camera optical lens comprising, from an object side to an image side:
   a first lens having a positive refractive power;
   a second lens having a negative refractive power;
   a third lens having a negative refractive power;
   a fourth lens having a positive refractive power; and
   a fifth lens having a negative refractive power;
   wherein the camera optical lens satisfies following conditions:

$0.40 \leq f1/f \leq 0.48$;

$-0.75 \leq f2/f \leq -0.50$;

$1.20 \leq f4/f \leq 3.20$;

$-1.40 \leq f5/f \leq -1.10$;

$6.00 \leq d1/d2 \leq 8.00$;

$0.80 \leq (R5+R6)/(R5-R6) \leq 6.50$; and $3.00 \leq (R7+R8)/(R7-R8) \leq 10.00$;

where
   f denotes a focal length of the camera optical lens;
   f1 denotes a focal length of the first lens;
   f2 denotes a focal length of the second lens;
   f4 denotes a focal length of the fourth lens;
   f5 denotes a focal length of the fifth lens;
   d1 denotes an on-axis thickness of the first lens;

d2 denotes an on-axis distance from the image-side surface of the first lens to the object-side surface of the second lens;

R5 denotes a curvature radius of the object-side surface of the third lens;

R6 denotes a curvature radius of the image-side surface of the third lens;

R7 denotes a curvature radius of the object-side surface of the fourth lens; and R8 denotes a curvature radius of the image-side surface of the fourth lens.

2. The camera optical lens according to claim 1, wherein the camera optical lens further satisfies a condition of:

$$-10.00 \leq f3/f \leq -0.80;$$

where f3 denotes a focal length of the third lens.

3. The camera optical lens according to claim 1, wherein the camera optical lens further satisfies following conditions:

$$-1.71 \leq (R1+R2)/(R1-R2) \leq -0.39; \text{ and}$$

$$0.08 \leq d1/TTL \leq 0.31;$$

where

R1 denotes a curvature radius of the object-side surface of the first lens;

R2 denotes a curvature radius of the image-side surface of the first lens; and

TTL denotes a total optical length from the object-side surface of the first lens to an image surface of the camera optical lens along an optical axis.

4. The camera optical lens according to claim 1, wherein the camera optical lens further satisfies following conditions:

$$0.41 \leq (R3+R4)/(R3-R4) \leq 4.41; \text{ and}$$

$$0.02 \leq d3/TTL \leq 0.07;$$

where

R3 denotes a curvature radius of the object-side surface of the second lens;

R4 denotes a curvature radius of the image-side surface of the second lens;

d3 denotes an on-axis thickness of the second lens; and

TTL denotes a total optical length from the object-side surface of the first lens to an image surface of the camera optical lens along an optical axis.

5. The camera optical lens according to claim 1, wherein the camera optical lens further satisfies following conditions:

$$0.02 \leq d5/TTL \leq 0.08;$$

Where d5 denotes an on-axis thickness of the third lens; and

TTL denotes a total optical length from the object-side surface of the first lens to an image surface of the camera optical lens along an optical axis.

6. The camera optical lens according to claim 1, wherein the camera optical lens further satisfies following conditions:

$$0.05 \leq d7/TTL \leq 0.16;$$

where d7 denotes an on-axis thickness of the fourth lens; and

TTL denotes a total optical length from the object-side surface of the first lens to an image surface of the camera optical lens along an optical axis.

7. The camera optical lens according to claim 1, wherein the camera optical lens further satisfies following conditions:

$$-6.99 \leq (R9+R10)/(R9-R10) \leq -0.55; \text{ and}$$

$$0.03 \leq d9/TTL \leq 0.09;$$

where

R9 denotes a curvature radius of the object-side surface of the fifth lens;

R10 denotes a curvature radius of the image-side surface of the fifth lens;

d9 denotes an on-axis thickness of the fifth lens; and

TTL denotes a total optical length from the object-side surface of the first lens to an image surface of the camera optical lens along an optical axis.

8. The camera optical lens according to claim 1, wherein the camera optical lens further satisfies a condition of:

$$0.34 \leq f12/f \leq 1.23;$$

where f12 donates a combined focal length of the first lens and the second lens.

9. The camera optical lens according to claim 1, wherein the camera optical lens further satisfies a condition of:

$$f/TTL \geq 1.09;$$

where

TTL denotes a total optical length from the object-side surface of the first lens to an image surface of the camera optical lens along an optical axis.

10. The camera optical lens according to claim 1, wherein the camera optical lens further satisfies a condition of:

$$Fno \leq 2.55;$$

where

Fno denotes an F number of the camera optical lens.

* * * * *